(12) United States Patent
Kumar

(10) Patent No.: US 12,510,178 B2
(45) Date of Patent: Dec. 30, 2025

(54) PROPORTIONAL ACTUATOR AND UNIBODY MAGNETIC HOUSING

(71) Applicant: Viraraghavan S. Kumar, Melbourne, FL (US)

(72) Inventor: Viraraghavan S. Kumar, Melbourne, FL (US)

( * ) Notice: Subject to any disclaimer, the term of this patent is extended or adjusted under 35 U.S.C. 154(b) by 145 days.

(21) Appl. No.: 18/334,691

(22) Filed: Jun. 14, 2023

(65) Prior Publication Data
US 2024/0418285 A1     Dec. 19, 2024

(51) Int. Cl.
F16K 27/02     (2006.01)
F16K 31/06     (2006.01)

(52) U.S. Cl.
CPC ........ *F16K 27/029* (2013.01); *F16K 31/0655* (2013.01); *F16K 31/0675* (2013.01)

(58) Field of Classification Search
CPC ... F16K 2/029; F16K 31/0655; F16K 31/0675
See application file for complete search history.

(56) References Cited

U.S. PATENT DOCUMENTS

| | | |
|---|---|---|
| 4,004,343 A | 1/1977 | Marsden |
| 4,494,726 A | 1/1985 | Kumar et al. |
| 4,623,118 A | 11/1986 | Kumar |
| 4,932,630 A | 6/1990 | Kumar |
| 4,950,016 A | 8/1990 | Kumar |
| 4,954,799 A | 9/1990 | Kumar |
| 5,033,677 A | 7/1991 | Kumar |
| 5,301,921 A | 4/1994 | Kumar |
| 5,407,174 A | 4/1995 | Kumar |
| 5,419,530 A | 5/1995 | Kumar |
| 5,785,298 A | 7/1998 | Kumar |
| 6,047,947 A | 4/2000 | Kumar |
| 6,198,369 B1 | 3/2001 | Ward et al. |
| 6,224,033 B1 | 5/2001 | Kumar et al. |
| 6,604,726 B2 | 8/2003 | Kumar |
| 6,715,732 B2 | 4/2004 | Kumar |
| 7,028,978 B2 | 4/2006 | Kumar |
| 7,278,447 B2 | 10/2007 | Kumar |
| 8,253,063 B2 | 8/2012 | Alexander et al. |
| 2005/0145812 A1 | 7/2005 | Kumar |
| 2005/0145813 A1 | 7/2005 | Kumar |
| 2016/0298784 A1 | 10/2016 | Kumar et al. |
| 2017/0254437 A1* | 9/2017 | Pellmann ................ H01F 7/126 |
| 2018/0172176 A1 | 6/2018 | Kumar et al. |
| 2019/0032809 A1 | 1/2019 | Kumar et al. |
| 2020/0408319 A1* | 12/2020 | Chen ..................... F16K 27/048 |

FOREIGN PATENT DOCUMENTS

WO    WO 2004/044468    5/2004

* cited by examiner

*Primary Examiner* — Michael R Reid

(74) *Attorney, Agent, or Firm* — The Bilicki Law Firm, PC; James A. Cairns

(57) ABSTRACT

A proportional actuator, and a unibody magnetic housing for use in a proportional actuator. The proportional actuator includes a coil assembly with a coil and coil cover; the coil assembly is fitted to the unibody magnetic housing to form a magnetic coupling. The unibody magnetic housing includes a wall having a region of varying wall thickness, which may be formed by an annular groove, and a central bore in which a plunger may be slidably mounted so that its end moves along the region of varying wall thickness as it slides within the central bore.

13 Claims, 9 Drawing Sheets

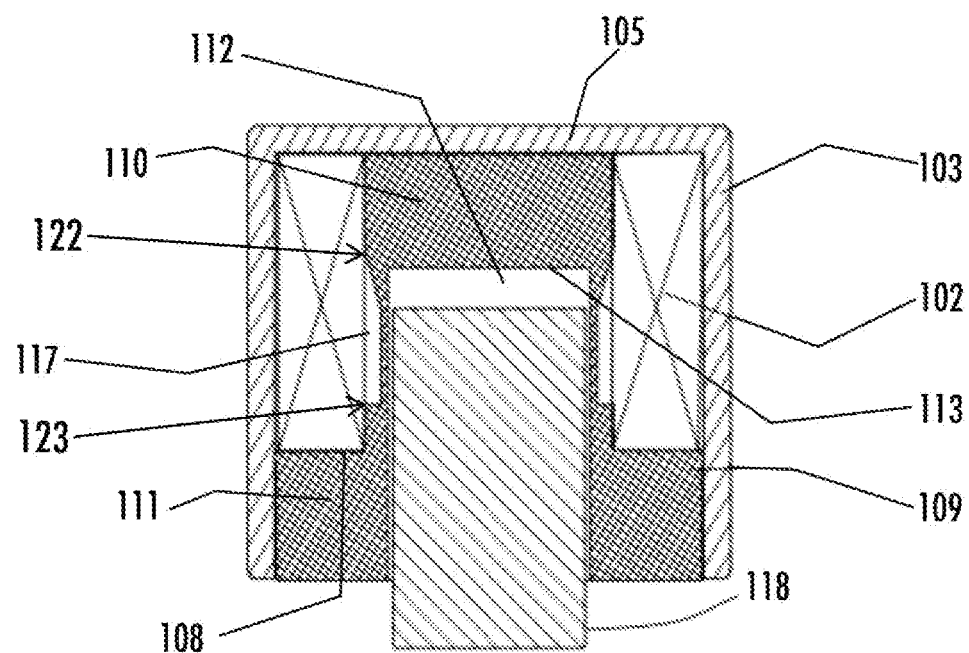
FIG. 3
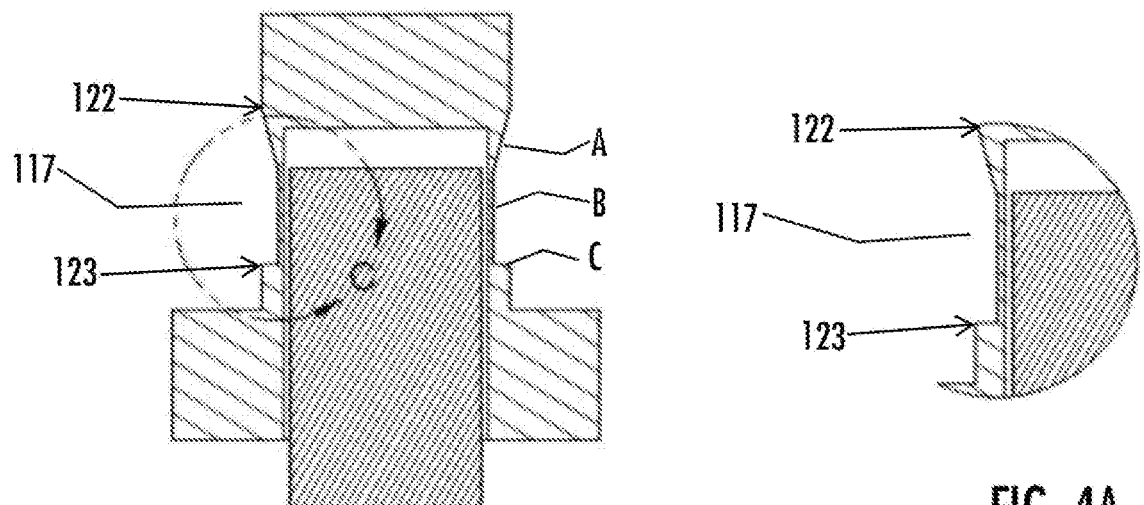
FIG. 4
FIG. 4A

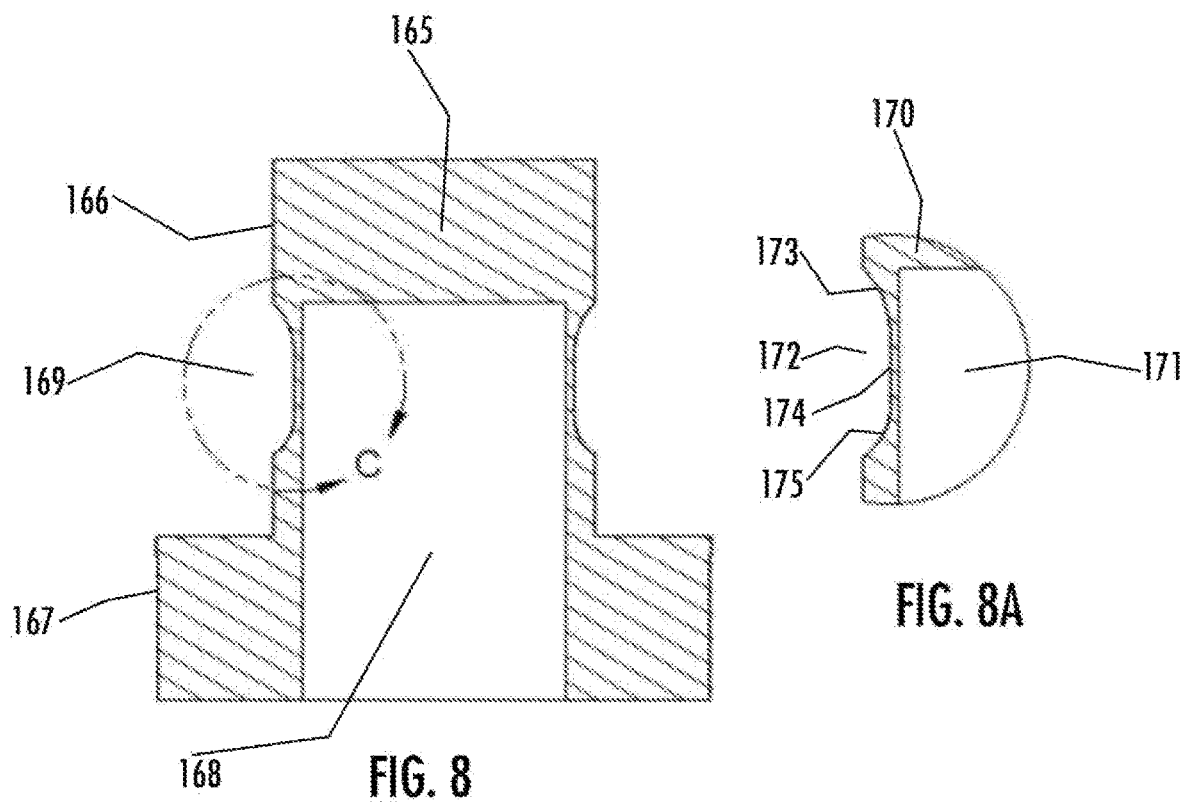
FIG. 8
FIG. 8A
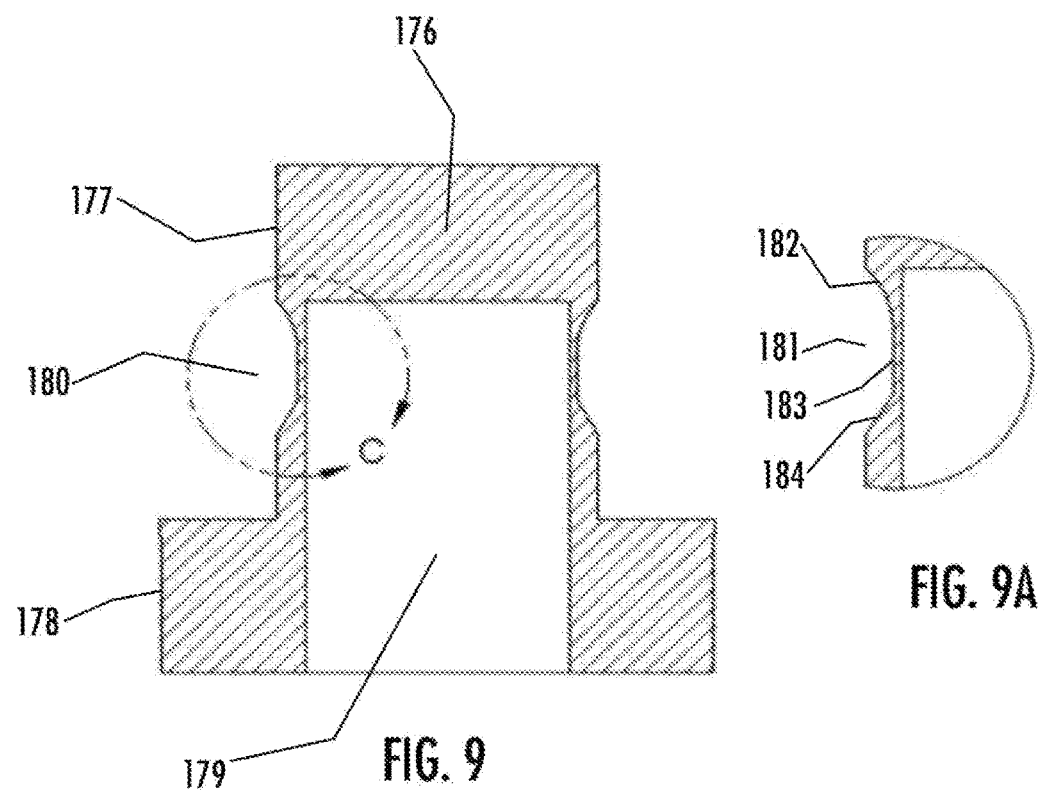
FIG. 9
FIG. 9A

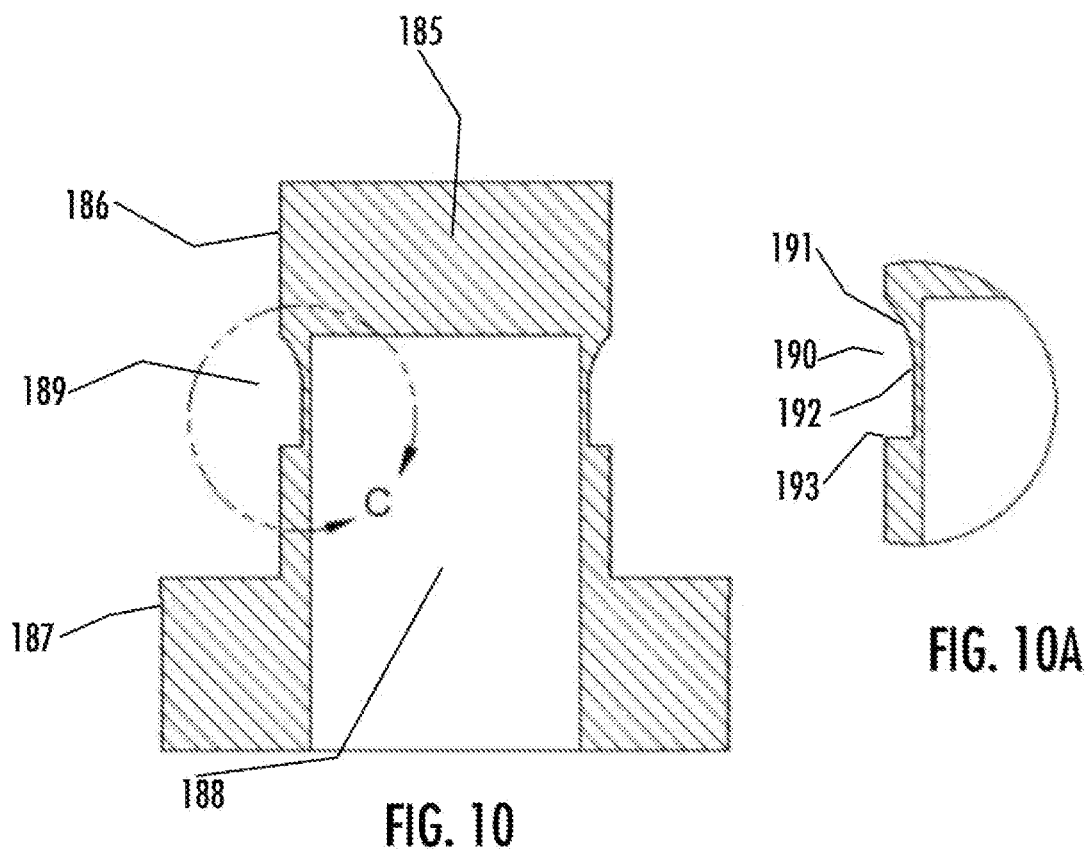
FIG. 10
FIG. 10A
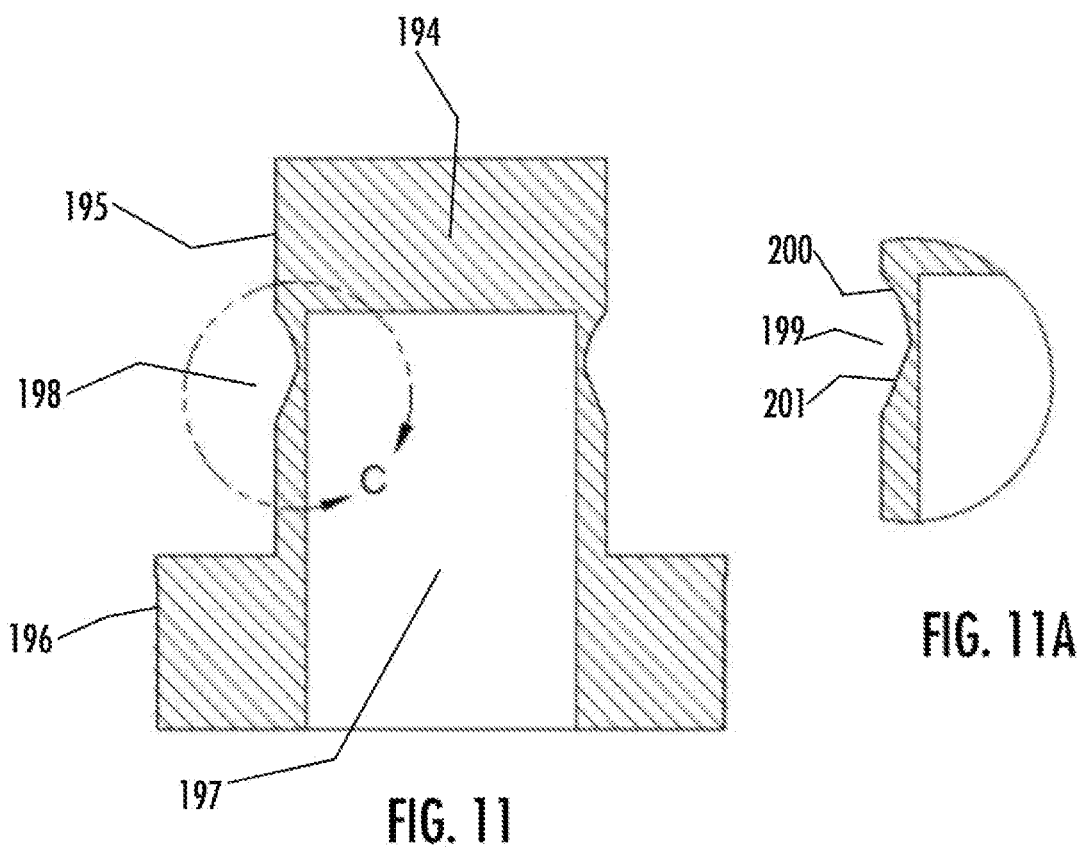
FIG. 11
FIG. 11A

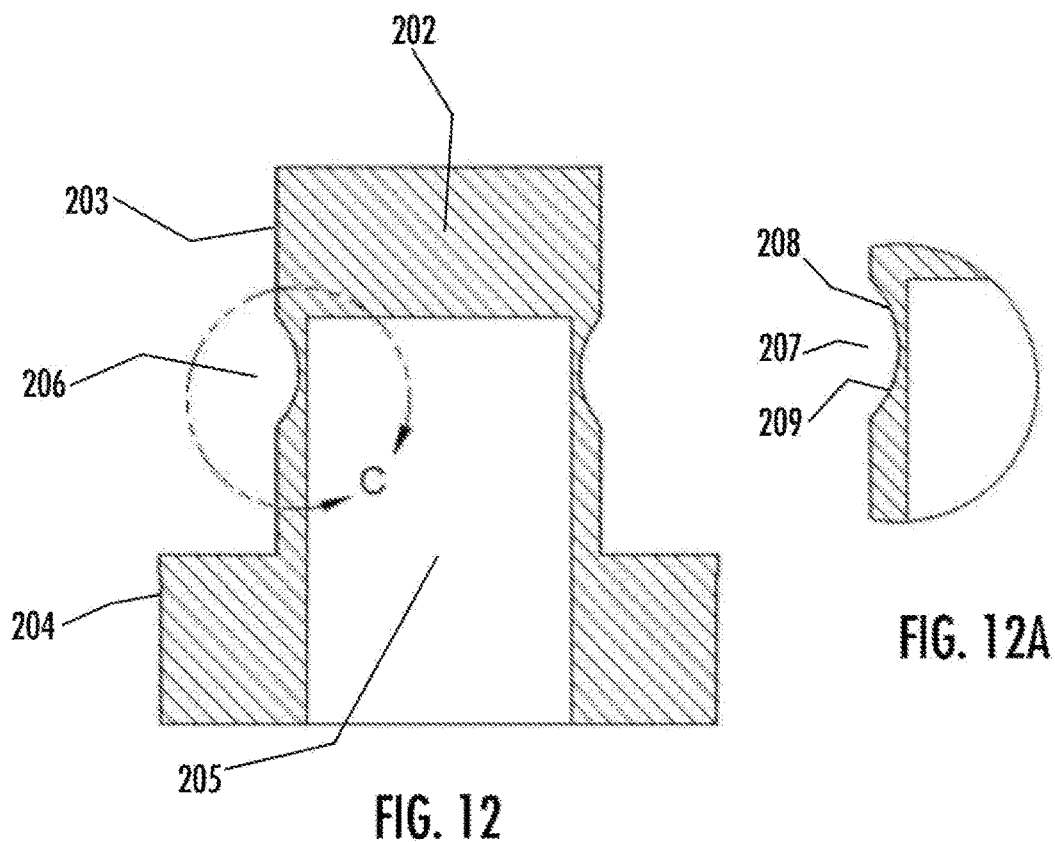
FIG. 12
FIG. 12A
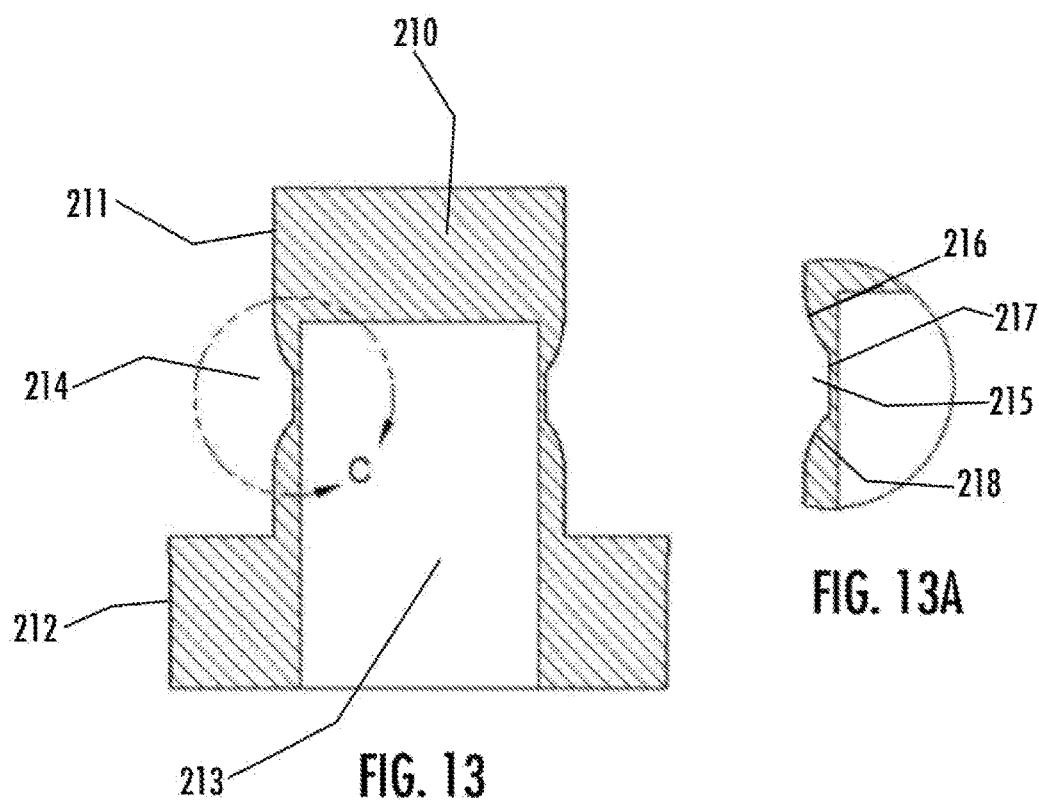
FIG. 13
FIG. 13A

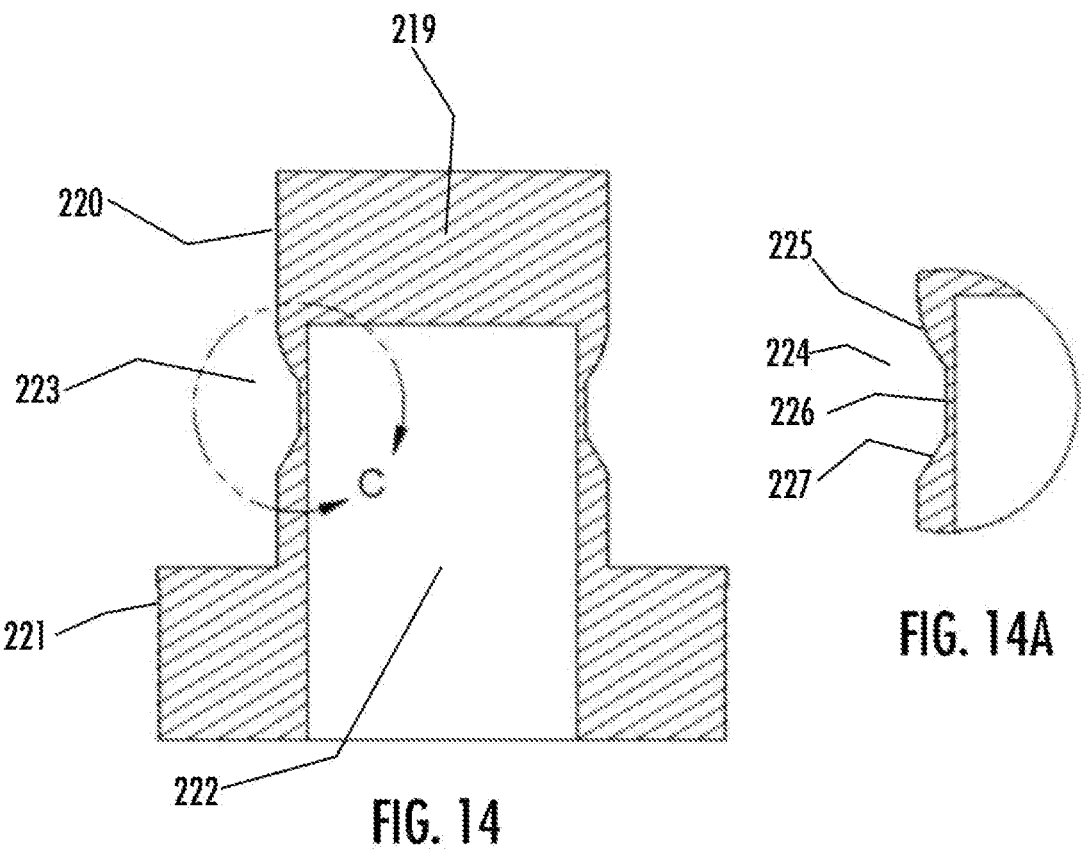
FIG. 14
FIG. 14A
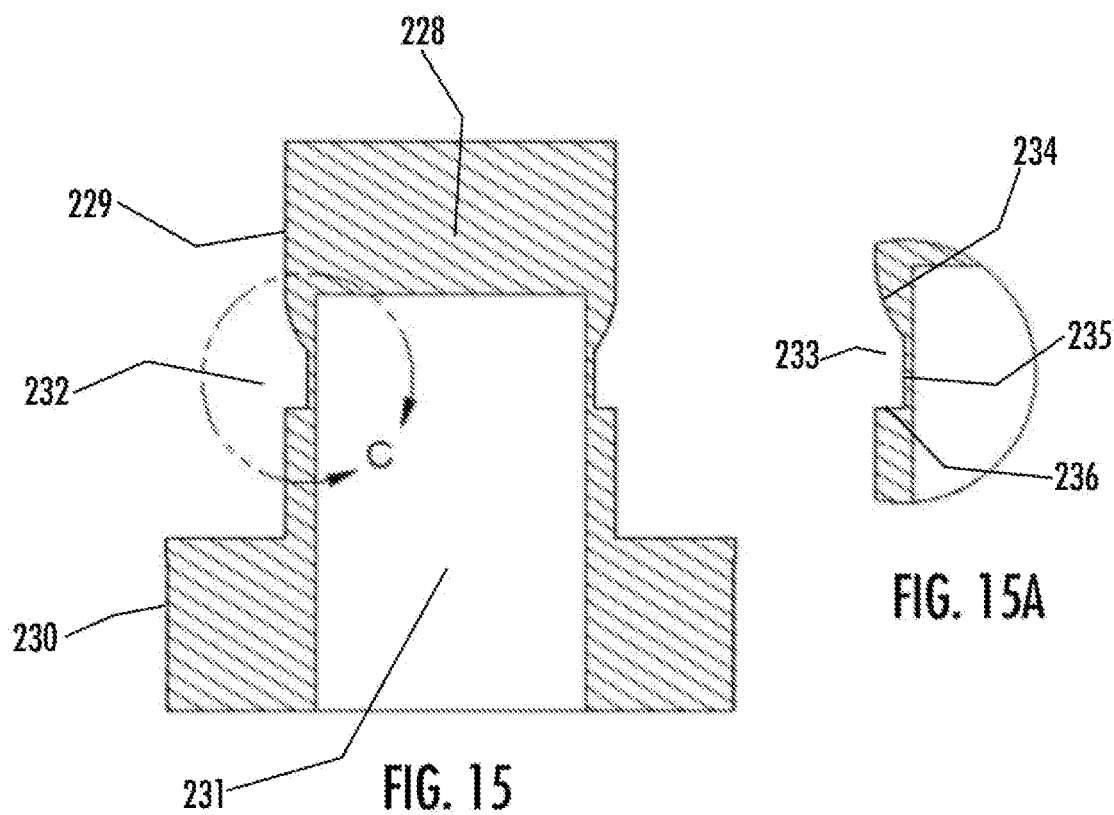
FIG. 15
FIG. 15A

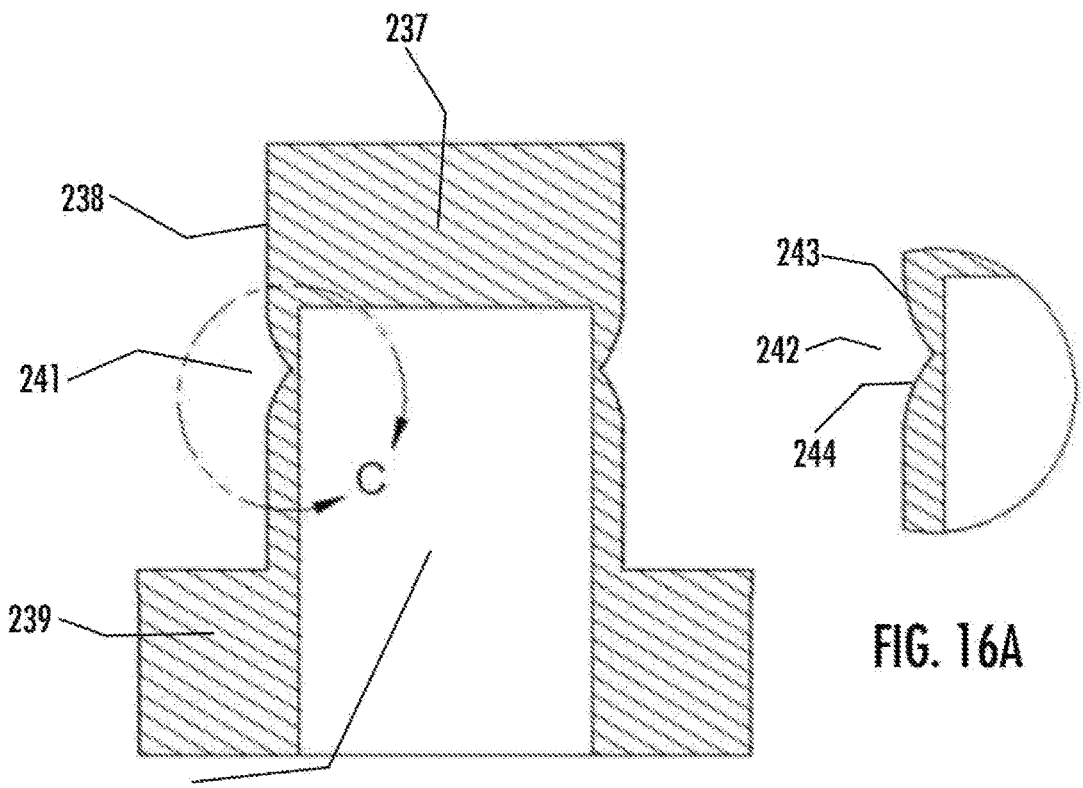
FIG. 16
FIG. 16A
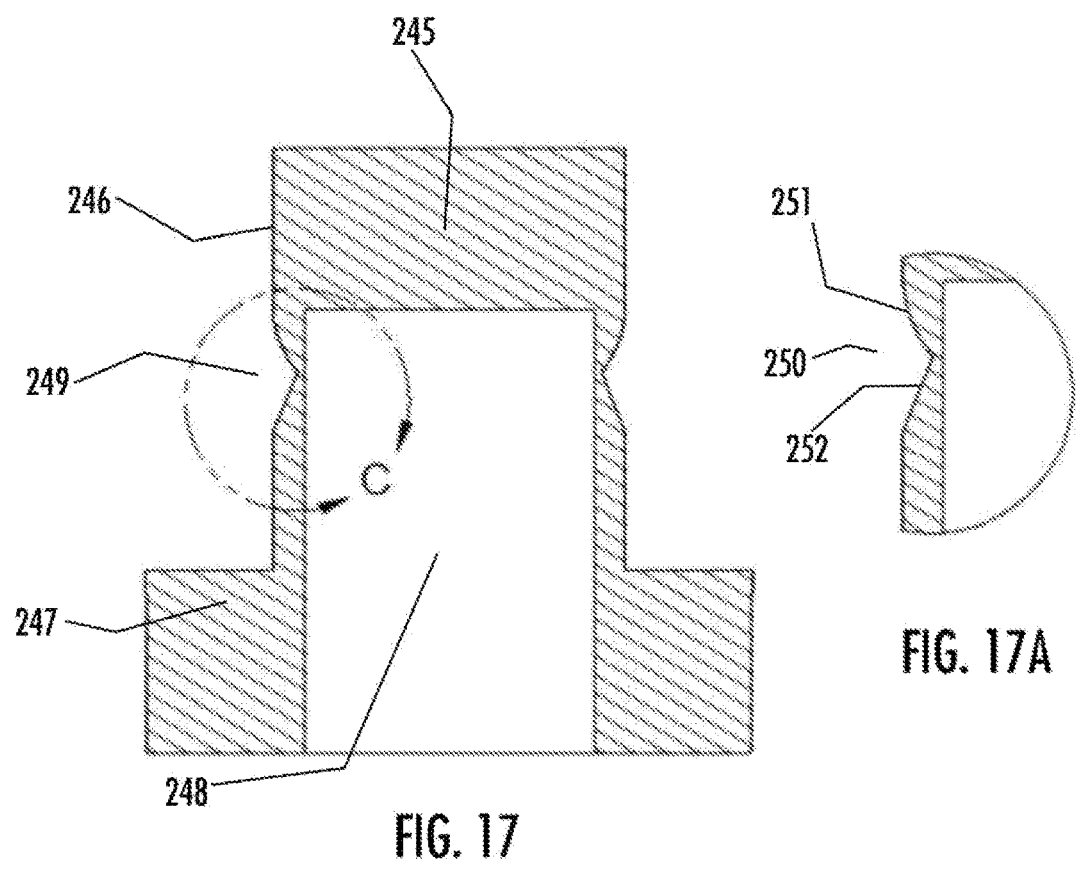
FIG. 17
FIG. 17A

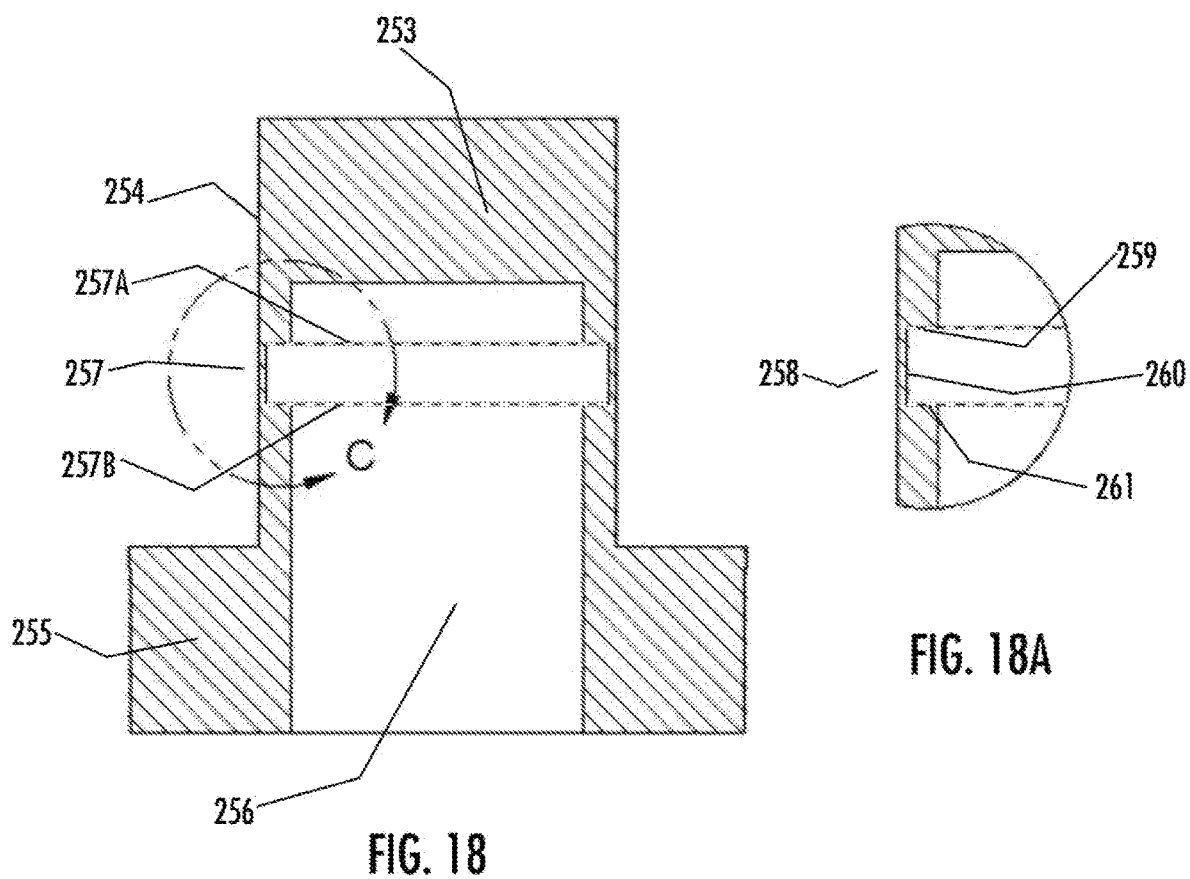
FIG. 18
FIG. 18A
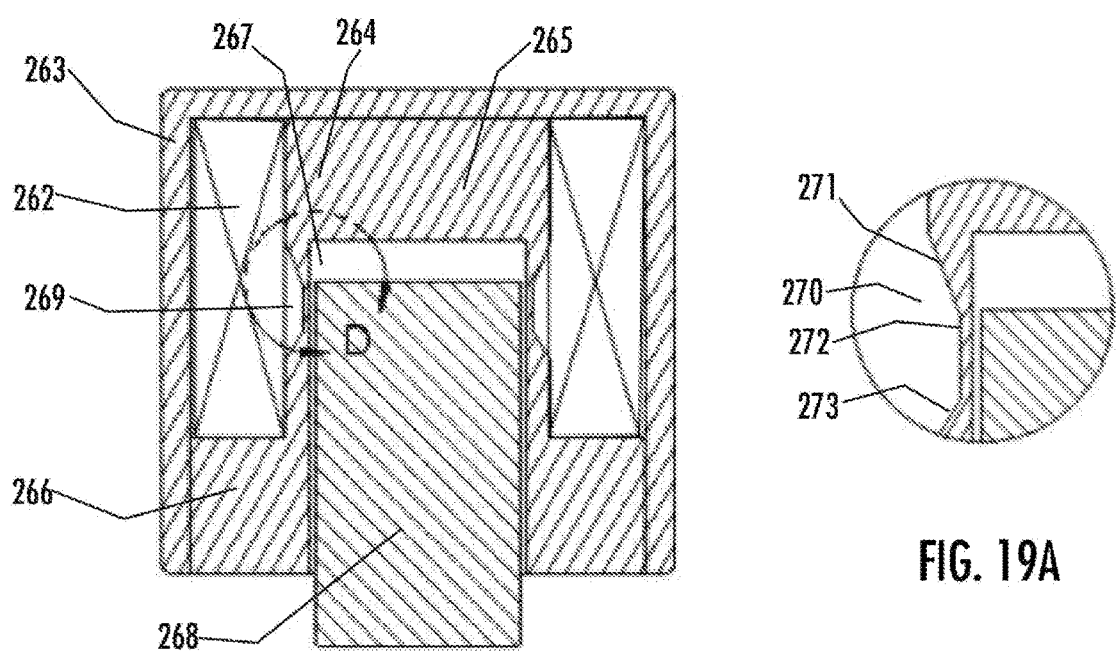
FIG. 19
FIG. 19A

PROPORTIONAL ACTUATOR AND UNIBODY MAGNETIC HOUSING

BRIEF DESCRIPTION OF DRAWINGS

FIG. 3 is a depiction of an alternative proportional actuator with unibody magnetic housing.

FIG. 4 is a depiction of the unibody magnetic housing of FIG. 3 including a region of varying wall thickness in region C.

FIG. 4A is a depiction of region C of FIG. 4.

FIG. 8 is a depiction of a unibody magnetic housing including a region of varying wall thickness in region C.

FIG. 8A is a depiction of region C of FIG. 8.

FIG. 9 is a depiction of another unibody magnetic housing including a region of varying wall thickness in region C.

FIG. 9A is a depiction region C of FIG. 9.

FIG. 10 is a depiction of yet another unibody magnetic housing including a region of varying wall thickness in region C.

FIG. 10A is a depiction of region C of FIG. 10.

FIG. 11 is a depiction of a further alternative unibody magnetic housing including a region of varying wall thickness in region C.

FIG. 11A is a depiction of region C of FIG. 11.

FIG. 12 is a depiction of yet another alternative unibody magnetic housing including a region of varying wall thickness in region C.

FIG. 12A is a depiction of region C of FIG. 12.

FIG. 13 is a depiction of a yet further alternative unibody magnetic housing including a region of varying wall thickness in region C.

FIG. 13A is a depiction of region C of FIG. 13.

FIG. 14 is a depiction of another alternative unibody magnetic housing including a region of varying wall thickness in region C.

FIG. 14A is a depiction of region C of FIG. 14.

FIG. 15 is a depiction of a further alternative unibody magnetic housing including a region of varying wall thickness in region C.

FIG. 15A is a depiction of region C of FIG. 15.

FIG. 16 is a depiction of another unibody magnetic housing including a region of varying wall thickness in region C.

FIG. 16A is a depiction of region C of FIG. 16.

FIG. 17 is a depiction of yet another unibody magnetic housing including a region of varying wall thickness in region C.

FIG. 17A is a depiction of region C of FIG. 17.

FIG. 18 is a depiction of yet further unibody magnetic housing including a region of varying wall thickness in region C.

FIG. 18A is a depiction of region C of FIG. 17.

FIG. 19 is a depiction of another alternative proportional actuator including a region of varying wall thickness in region D.

FIG. 19A is a depiction of region D of FIG. 17.

BACKGROUND

Figure 1:
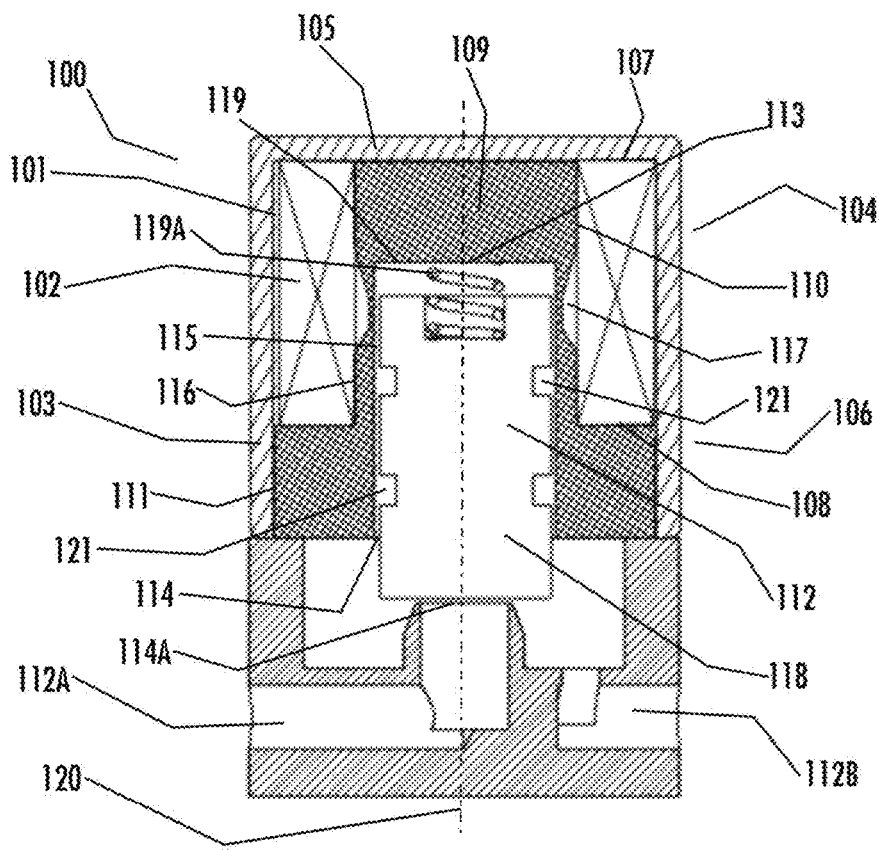
FIG. 1 is a depiction of a solenoid valve assembly including a proportional actuator with unibody magnetic housing.

Proportional control devices may employ a valve actuated by a solenoid for controlling a fluid flow in a manner that is substantially proportional to the current applied to the solenoid. Such control may be attained by use of a proportional actuator. A proportional actuator causes the output of the proportional control device to be related directly to the applied current, and independent of a function being controlled. For example, in one application of a proportional control device a proportional control valve may control pressure, and the rate of flow of fluid through the valve is proportional to the magnitude of the applied current.

Typically, proportional actuators include a magnetic component inside a solenoid coil. Current applied to the solenoid coil creates an attractive field in the magnetic component, which can move a slidable component, such as a plunger, to operate a valve that provides fluid communication between an inlet port and an outlet port.

A proportional solenoid actuator may include a housing made from a magnetic material and having a central bore in which the slidable component can be mounted. A region of the magnetic housing around the central bore may be non-magnetic, with performance characteristics, including the force and the stroke of the solenoid and plunger, being affected by the design of the magnetic and non-magnetic components. The shape, width, and thickness of the non-magnetic region, which may be radial, can help define the solenoid force and stroke characteristics.

SUMMARY

The present apparatus is directed to a proportional actuator having a coil assembly that includes a coil and a coil cover. The coil cover has an upper portion with a closed top, and a bottom portion, with the coil being located inside the upper portion. The coil has a coil top facing the closed top of the coil cover, and a coil bottom facing the bottom portion of the coil cover.

A unibody magnetic housing is located inside the coil cover, and includes an upper portion located inside the coil, a lower portion located below the coil, and a central bore having a closed end within the upper portion and an open end within the lower portion.

The coil assembly is fitted to the unibody magnetic housing to form a magnetic coupling. The upper portion of the unibody magnetic housing includes an inside wall facing the central bore, an outside wall facing the coil, and a region of varying wall thickness. A plunger may be slidably placed within the central bore and has a first end that faces the closed end of the central bore and is movable along the region of varying wall thickness as the plunger slides within the central bore.

The coil, coil cover, unibody housing, central bore, and plunger may have a common central axis.

The region of varying wall thickness may extend from a starting point located between the closed top of the coil cover and the closed end of the central bore, to an ending point no lower than the coil bottom. The starting point may be located below the closed top of the coil cover and above the closed end of the central bore, to an ending point no lower than, or alternatively above, the coil bottom.

The region of varying wall thickness may include an annular groove in at least one of the outside wall and the inside wall of upper portion of the unibody magnetic housing. The annular groove may include, moving from the starting point towards the ending point, at least a first wall segment and a second wall segment. The first wall segment may be characterized by a decrease in wall thickness over its length, and the second wall segment may be characterized by an increase in wall thickness over its length.

The decrease in wall thickness over the first segment and the increase in wall thickness over the second segment may be symmetrical, such that the wall thickness at the starting point is equal to the wall thickness at the ending point. At least one of the decrease in wall thickness and the increase in wall thickness may be linear or non-linear, and the decrease and increase may be the same or different.

The second wall segment may extend from the first wall segment at a right angle towards the outside wall.

The region of varying wall thickness may include a third wall segment located between, and continuous with, the first wall segment and the second wall segment. The third wall segment may be characterized by a constant wall thickness along its length.

The second wall segment may extend from the third wall segment at a right angle towards the outside wall.

The present application is also directed to a unibody magnetic housing for use with a proportional actuator. The unibody magnetic housing may include a top, an upper portion descending from the top, and a lower portion descending from the upper portion, with the top, the upper portion, and the lower portion having a unibody construction. The unibody magnetic housing may have a central bore with a closed end within its upper portion and an open end within its lower portion.

The upper portion may further include an inside wall facing the central bore, an outside wall facing away from the central bore, and a region of varying wall thickness. The region of varying wall thickness may include an annular groove in the outside wall.

DETAILED DESCRIPTION

The presently claimed apparatus includes a unibody magnetic housing having a central bore, in which a plunger or similar element may slide. The unibody magnetic housing has a wall adjacent the central bore, and the wall has a region of varying wall thickness. The region of varying wall thickness may be formed, by way of non-limiting example only, by an annular groove in the wall of the unibody magnetic housing, and may be present on the outside of the wall, the inside of the wall, or both the outside and inside of the wall. The region of varying thickness is located in the magnetic flux flow path created in the unibody magnetic housing when the solenoid coil is energized and becomes rapidly saturated by the magnetic field generated by the coil.

The region of varying wall thickness may have at least two segments. Including a first wall segment characterized by decreasing wall thickness and a second wall segment characterized by increasing wall thickness. A third wall segment may be located between the first and second wall segments, and may have a substantially constant wall thickness.

The unibody magnetic housing is formed from a single piece of material. The area of the unibody magnetic housing along the central bore may be characterized as having an inside wall, which faces the central bore, and an outside wall. The region of varying wall thickness is formed by removing material from the unibody magnetic housing in a ring or annulus around the inside and/or outside wall. The ring or annulus may be shaped, by way of non-limiting example, by physically machining the unibody magnetic housing, by directing a laser at the circumferential region of the unibody magnetic housing, or by any other suitable means. Alternatively, the unibody magnetic housing may be cast with the desired region of varying wall thickness present in the mold. Other than the material present in the unibody magnetic housing, no other materials are used to make the region of varying wall thickness, and no other materials are present in that region.

FIG. 1 shows solenoid valve 100 including coil assembly 101, which includes coil 102 and coil cover 103. Coil cover 103 surrounds coil 102 and includes upper portion 104 with closed top 105, and bottom portion 106. Coil 102 includes coil top 107 and coil bottom 108. Unibody magnetic housing 109 is also located within coil cover 103, and includes upper portion 110 located within coil 102 and lower portion 111 located below coil bottom 108 which may, but does not necessarily, extend laterally to coil cover 103. Unibody magnetic housing 109 further includes central bore 112, having closed end 113 within upper portion 110 and open end 114 within lower portion 111. Coil assembly 101 is fitted to unibody magnetic housing 109 to form a magnetic coupling.

Upper portion 110 of unibody magnetic housing 109 includes inside wall 115 facing central bore 112, and outside wall 116 facing coil 102. Region of varying wall thickness 117 is formed between inside wall 115 and outside wall 116. In FIG. 1 region of varying wall thickness 117 is formed by an annular groove in outside wall 116, but it may also be formed by a groove in inside wall 115, or by grooves in both inside wall 115 and outside wall 116.

Central bore 112 is adapted to receive plunger 118, which may be slidably mounted therein as facilitated by bearings 121, and have a first end 119 facing closed end 113 of central bore 112.

Coil 102, coil cover 103, unibody magnetic housing 109, and central bore 112 may generally be cylindrical and coaxial, sharing common central axis 120.

Valve 100 may also include may also a biasing member to resist motion of plunger 118 towards closed end 113 of central bore 112. In FIG. 1 this biasing member is represented by spring 119A, but any suitable source of biasing force may be used.

Figure 2:
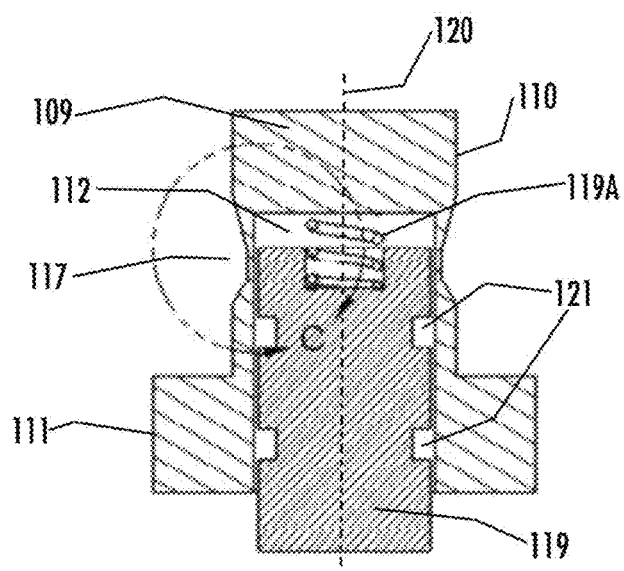
FIG. 2 is a depiction of the unibody magnetic housing of FIG. 1 including a region of varying wall thickness in region C.

FIG. 2 shows unibody magnetic housing 109, including upper portion 110 having region of varying wall thickness 117, and lower portion 111. Central bore 112 receives plunger 119 in a slidable relationship, which may be facilitated by bearings 121. Movement of plunger 119 towards upper portion 110 may be resisted by a biasing force, provided here in the form of spring 119A, though any suitable source of biasing force may be used. Unibody magnetic housing 109, central bore 112, and plunger 119 share common central axis 120.

Figure 2A:
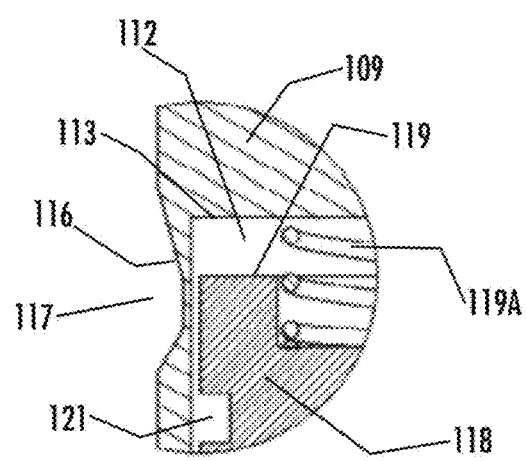
FIG. 2A is a depiction of region C of FIG. 2.

FIG. 2A is detail C of FIG. 2, showing region of varying wall thickness 117 formed by a groove in outside wall 116 of unibody magnetic housing 109. Also shown are plunger 118 having first end 119 facing closed end 113 of central bore 112, bearings in bearing space 121, and biasing spring 119A.

FIG. 3 presents another view of the present proportional actuator, including coil 102; coil cover 103; unibody magnetic housing 109 with upper portion 110 and lower portion 111; and plunger 118 in central bore 112. In this embodiment, region of varying wall thickness 117 is shown having starting point 122 located between closed top 105 of coil cover 103, and closed end 113 of central bore 112; and ending point 123 located below starting point 122 and above coil bottom 108 of coil 102. It can be seen that region of varying wall thickness 117 is characterized in this embodiment by, moving from starting point 122 towards ending point 123, a first wall segment having a linear slope where the wall thickness of unibody magnetic housing 109 continuously decreases along the segment; a second wall segment in which the wall thickness is constant; and a third wall at a right angle to the second wall segment.

While starting point 122 is generally depicted herein as being located above the closed end of the central bore, this is done to ensure that the region of varying wall thickness covers the travel of the plunger through its uppermost extent ('top dead center') in the central bore. The starting point may also be located at the same level as the closed end of the central bore, or below the closed end, depending on the desired force and stroke characteristics of the actuator.

FIGS. 4 and 4A focus on the unibody magnetic housing and region of varying wall thickness shown in FIG. 3. In FIG. 4, the first wall segment having a linear slope with continuously decreasing wall thickness is shown as element A; the second wall segment with constant wall thickness is shown as element B; and the third wall segment formed at a right angle to the second wall segment is shown as element C. FIG. 4A shows region C of FIG. 4, including region of varying wall thickness 117 having starting point 122 and ending point 123.

Figure 5:
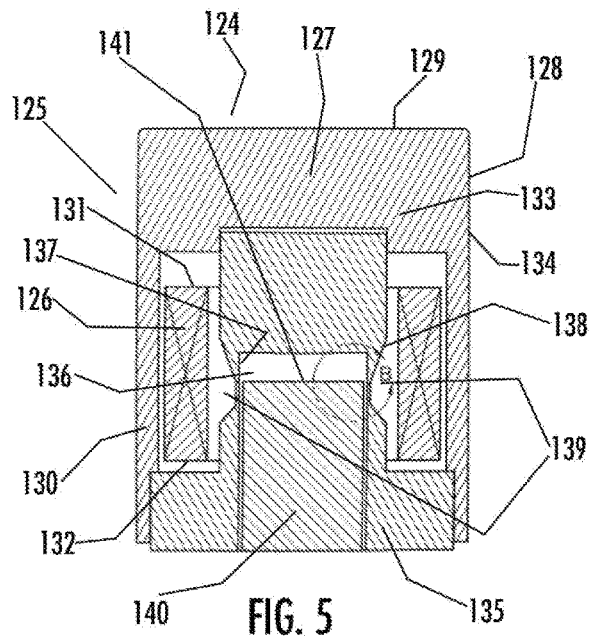
FIG. 5 is a depiction of an alternative proportional actuator with unibody magnetic housing, including region B.

FIG. 5 shows proportional actuator 124 with coil assembly 125 that includes coil 126, including coil bottom 132, and coil cover 127, which includes bottom portion 130. Coil cover 127 includes upper portion 128, closed top 129, and bottom portion 130, while coil 126 includes coil top 131 and coil bottom 132.

Also shown is unibody magnetic housing 133, having upper portion 134, lower portion 135, and central bore 136. Region of varying wall thickness 139 is formed between inside wall 137 and outside wall 138 of unibody magnetic housing 133. During operation of proportional actuator 124, first end 141 of plunger 140 moves along region of varying wall thickness 139.

Figure 5A:
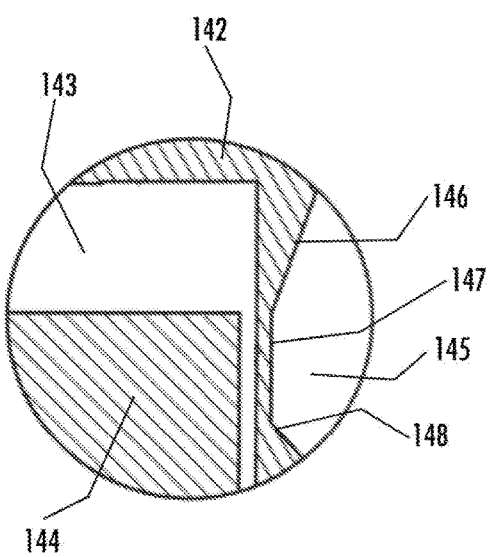
FIG. 5A is a depiction of region B of FIG. 5.

FIG. 5A provides an enlarged view of area B from FIG. 5, including unibody magnetic housing 142 with central bore 143. Region of varying wall thickness 145 includes first wall segment 146, shown here as having a decrease in wall thickness over its length; second wall segment 147, having a substantially constant wall thickness; and third wall segment 148, having an increase in wall thickness over its length. Both the decrease in wall thickness of the first wall segment and the increase in wall thickness of the second wall segment are shown as being linear in nature, but either or both may be non-linear, i.e., curvilinear. The first wall segment and second wall segment are also shown as non-symmetrical in FIGS. 5 and 5A, with the second wall segment having a steeper slope and thereby a shorter length than the first wall segment, but symmetrical segments are also within the present scope.

As used herein, if two wall segments are described as "symmetrical" or the like it means that they are mirror images of each other, and if they are described as "asymmetrical" or the like, it means that they are not mirror images of each other.

Figure 6:
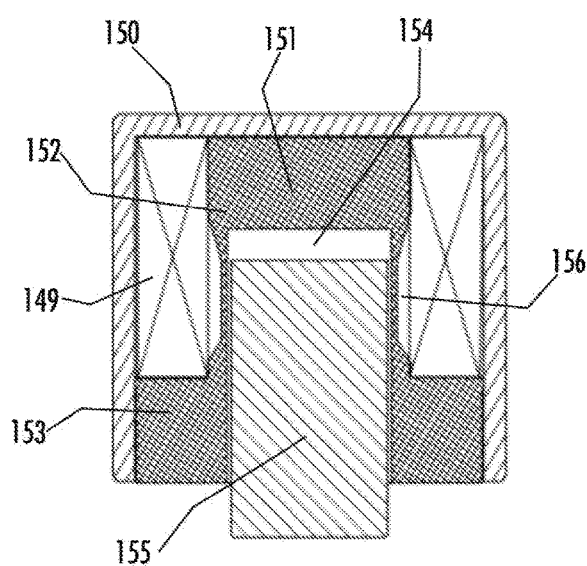
FIG. 6 is a depiction of another alternative proportional actuator with unibody magnetic housing.

FIG. 6 is another embodiment of the present proportional actuator, including coil 149 and coil cover 150. Also shown is unibody magnetic housing 151, having upper portion 152, lower portion 153, and central bore 154. Plunger 155 may be slidably mounted in central bore 154 such that, in operation, its upper end moves along region of varying wall thickness 156. As shown here, region of varying wall thickness 156 has first and second wall segments that are linear and symmetrical and are connected by a third wall segment with a substantially constant wall thickness.

Figure 7:
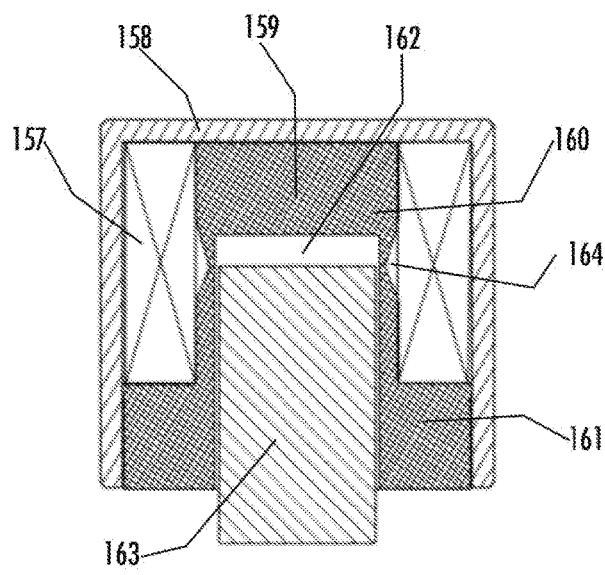
FIG. 7 is a depiction of yet another alternative proportional actuator with unibody magnetic housing.

FIG. 7 is yet another embodiment of the present proportional actuator, including coil 157 and coil cover 158, and unibody magnetic housing 159 having upper portion 160, lower portion 161, and central bore 162. Plunger 163 may be slidably mounted in central bore 162 such that, in operation, its upper end moves along region of varying wall thickness 164. As shown here, region of varying wall thickness 164 has first and second wall segments that are linear and symmetrical, without a third wall segment.

FIGS. 8 through 18A, inclusive, illustrate a number of alternatives for the region of varying wall thickness.

FIG. 8 depicts unibody magnetic housing 165 having upper portion 166, lower portion 167, and central bore 168. Region of varying wall thickness 169, within area C, is located along the adjacency between central bore 168 and upper portion 166 of unibody magnetic housing 165. FIG. 8A is area C of FIG. 8 and shows unibody magnetic housing 170, central bore 171, and region of varying wall thickness 172 which includes first wall segment 173, second wall segment 174, and third wall segment 175. In this embodiment the wall thickness in the region of varying wall thickness decreases along first wall segment 173, remains substantially constant along second wall segment 174, and increases along third wall segment 175. Moreover, first wall segment 173 and third wall segment 175 are both curvilinear and symmetrical.

FIG. 9 depicts unibody magnetic housing 176 having upper portion 177, lower portion 178, and central bore 179. Region of varying wall thickness 180, within area C, is located along the adjacency between central bore 179 and upper portion 177 of unibody magnetic housing 176. FIG. 9A is area C of FIG. 9 and shows region of varying wall thickness 181 which includes first wall segment 182, second wall segment 183, and third wall segment 184. In this embodiment the wall thickness in the region of varying wall thickness decreases along first wall segment 182, remains substantially constant along second wall segment 183, and increases along third wall segment 184. Moreover, first wall segment 182 and third wall segment 184 are asymmetrical, with first wall segment 182 being curvilinear and third wall segment 184 being linear.

FIG. 10 shows unibody magnetic housing 185 having upper portion 186, lower portion 187, and central bore 188. Region of varying wall thickness 189, within area C, is located along the adjacency between central bore 188 and upper portion 186 of unibody magnetic housing 185. FIG. 10A is area C of FIG. 10 and shows region of varying wall thickness 190 which includes first wall segment 191, second wall segment 192, and third wall segment 193. In this embodiment the wall thickness in the region of varying wall thickness decreases along first wall segment 191, remains substantially constant along second wall segment 192, and third wall segment 193 is at a right angle to second wall segment 192. Moreover, first wall segment 191 and third wall segment 193 are asymmetrical, with first wall segment 191 being curvilinear and third wall segment 193 being linear.

FIG. 11 depicts unibody magnetic housing 194 having upper portion 195, lower portion 196, and central bore 197. Region of varying wall thickness 198, within area C, is located along the adjacency between central bore 197 and upper portion 195 of unibody magnetic housing 194. FIG. 11A is area C of FIG. 11 and shows region of varying wall thickness 199 which includes first wall segment 200 and second wall segment 201; in this embodiment, there is no third wall segment. The wall thickness in the region of varying wall thickness decreases along first wall segment 200 and increases along second wall segment 201. Moreover, first wall segment 200 and second wall segment 201 are asymmetrical, with first wall segment 200 being curvilinear and third wall segment 201 being linear and having a longer length than first wall segment 200.

FIG. 12 depicts unibody magnetic housing 202 having upper portion 203, lower portion 204, and central bore 205. Region of varying wall thickness 206, within area C, is located along the adjacency between central bore 205 and upper portion 203 of unibody magnetic housing 202. FIG. 12A is area C of FIG. 12 and shows region of varying wall thickness 207 which includes first wall segment 208 and second wall segment 209; as in the previous embodiment, there is no third wall segment. The wall thickness in the region of varying wall thickness decreases along first wall segment 208 and increases along second wall segment 209. First wall segment 208 and second wall segment 209 are symmetrical.

FIG. 13 shows unibody magnetic housing 210 having upper portion 211, lower portion 212, and central bore 213. Region of varying wall thickness 214, within area C, is located along the adjacency between central bore 213 and upper portion 211 of unibody magnetic housing 210. FIG. 13A is area C of FIG. 13 and shows region of varying wall thickness 215 which includes first wall segment 216, second wall segment 217, and third wall segment 218. In this embodiment the wall thickness in the region of varying wall thickness decreases along first wall segment 216, remains substantially constant along second wall segment 217, and increases along third wall segment 218. Moreover, both of first wall segment 216 and third wall segment 218 are symmetrical and curvilinear.

FIG. 14 shows unibody magnetic housing 219 having upper portion 220, lower portion 221, and central bore 222. Region of varying wall thickness 2223, within area C, is located along the adjacency between central bore 222 and upper portion 220 of unibody magnetic housing 219. FIG. 14A is area C of FIG. 14 and shows region of varying wall thickness 224 which includes first wall segment 225, second wall segment 226, and third wall segment 227. In this embodiment the wall thickness in the region of varying wall thickness decreases along first wall segment 225, remains substantially constant along second wall segment 226, and increases along third wall segment 227. First wall segment 225 and third wall segment 227 are asymmetrical, with first wall segment 225 being curvilinear and third wall segment 227 being linear.

FIG. 15 shows unibody magnetic housing 228 having upper portion 229, lower portion 230, and central bore 231. Region of varying wall thickness 232, within area C, is located along the adjacency between central bore 231 and upper portion 229 of unibody magnetic housing 228. FIG. 15A is area C of FIG. 15 and shows region of varying wall thickness 233 which includes first wall segment 234, second wall segment 235, and third wall segment 236. In this embodiment the wall thickness in the region of varying wall thickness decreases along first wall segment 234, remains substantially constant along second wall segment 235, and third wall segment 236 is at a right angle to second wall segment 235. First wall segment 234 and third wall segment 236 are accordingly asymmetrical, both because first wall segment 234 is curvilinear and third wall segment 236 is linear, and because they are of different lengths.

FIG. 16 depicts unibody magnetic housing 237 having upper portion 238, lower portion 239, and central bore 240. Region of varying wall thickness 241, within area C, is located along the adjacency between central bore 240 and upper portion 238 of unibody magnetic housing 237. FIG. 16A is area C of FIG. 16 and shows region of varying wall thickness 242 which includes first wall segment 243 and second wall segment 244; there is no third wall segment. The wall thickness in the region of varying wall thickness decreases along first wall segment 243 and increases along second wall segment 244. First wall segment 243 and second wall segment 244 are symmetrical, both being curvilinear and of the same length.

FIG. 17 depicts unibody magnetic housing 245 having upper portion 246, lower portion 247, and central bore 248. Region of varying wall thickness 249, within area C, is located along the adjacency between central bore 248 and upper portion 246 of unibody magnetic housing 245. FIG. 17A is area C of FIG. 17 and shows region of varying wall thickness 250 which includes first wall segment 251 and second wall segment 252; there is no third wall segment. The wall thickness in the region of varying wall thickness decreases along first wall segment 251 and increases along second wall segment 252. First wall segment 251 and second wall segment 252 are asymmetrical, with first wall segment 251 being curvilinear and second wall segment 252 being linear.

FIG. 18 shows unibody magnetic housing 253 having upper portion 254, lower portion 255, and central bore 256. In this embodiment region of varying wall thickness 257, within area C, is formed on the inner wall of unibody magnetic housing 253, as indicated by dashed lines 257A and 257B, which represent the upper and lower boundaries, respectively, of a groove around the circumference of central bore 256.

FIG. 18A is area C of FIG. 18 and shows region of varying wall thickness 258 which includes first wall segment 259, second wall segment 260, and third wall segment 261. In this embodiment first wall segment 259 is formed at a right angle to the wall of central bore 256. Second wall segment 260 is at a right angle to first wall segment 259 and runs parallel to the wall of central bore 256, and to the outer wall of unibody magnetic housing 253; the wall thickness is substantially constant along its length. Third wall segment 261 is at a right angle to second wall segment 260. First wall segment 259 and third wall segment 260 are symmetrical.

FIG. 19 is another embodiment of the present proportional actuator, including coil 262 and coil cover 263. Also shown is unibody magnetic housing 264, having upper portion 265, lower portion 266, and central bore 267. Plunger 268 may be slidably mounted in central bore 267 such that, in operation, its upper end moves along region of varying wall thickness 269.

FIG. 19A is area D of FIG. 19 and shows region of varying wall thickness 270 which includes first wall segment 271, second wall segment 271, and third wall segment 273. In this embodiment the wall thickness in the region of varying wall thickness decreases along first wall segment 271, remains substantially constant along second wall segment 272, and increases along third wall segment 273. First wall segment 271 and third wall segment 272 are both linear and of equal length, and therefore are symmetrical.

While the present proportional actuator and unibody magnetic housing have been described herein with reference to particular embodiments, it will be understood by those skilled in the art that various changes may be made and equivalents may be substituted for elements thereof without departing from the intended scope. In addition, modifications may be made to adapt a particular situation or material to these teachings without departing from the intended scope.

I claim:

1. A proportional actuator comprising:
   a) a coil assembly comprising a coil and a coil cover;
   b) said coil cover having an upper portion with a closed top and a bottom portion, said coil being located inside said upper portion;
   c) said coil comprising a coil top facing said closed top of said coil cover and a coil bottom facing said bottom portion of said coil cover;
   d) a unibody magnetic housing located inside said coil cover, said unibody magnetic housing having an upper portion located inside said coil, a lower portion located below said coil, and a central bore having a closed end within said upper portion and an open end within said lower portion;
   e) said coil assembly fitted to said unibody magnetic housing to form a magnetic coupling;
   f) said upper portion of said unibody magnetic housing further comprising:
      a. an inside wall facing said central bore,
      b. an outside wall facing said coil, and
      c. a region of varying wall thickness; and,
   g) a plunger slidably placed within said central bore and having a first end facing said closed end of said central bore, said first end being movable along said region of varying wall thickness as said plunger slides within said central bore,
   h) further wherein:
      i) said coil, said coil cover, said unibody housing, said central bore, and said plunger have a common central axis; and,
      ii) wherein said region of varying wall thickness extends from a starting point between said closed top of said coil cover and said closed end of said central bore, to an ending point no lower than said coil bottom.

2. The proportional actuator of claim 1 wherein said region of varying wall thickness extends from a starting point below said closed top of said coil cover and above said closed end of said central bore, to an ending point no lower than said coil bottom.

3. The proportional actuator of claim 1 wherein said region of varying wall thickness extends from a starting point below said closed top of said coil cover and above said closed end of said central bore, to an ending point above said coil bottom.

4. The proportional actuator of claim 3 wherein said region of varying wall thickness comprises an annular groove in at least one of said outside wall and said inside wall of upper portion of said unibody magnetic housing.

5. The proportional actuator of claim 4 wherein said annular groove is in said outside wall.

6. The proportional actuator of claim 5 wherein said annular groove comprises, moving from said starting point towards said ending point, at least a first wall segment and a second wall segment.

7. The proportional actuator of claim 6 wherein, moving from said starting point towards said ending point, said first wall segment is characterized by a decrease in wall thickness over its length and said second wall segment is characterized by an increase in wall thickness over its length.

8. The proportional actuator of claim 7 wherein said decrease in wall thickness and said increase in wall thickness are symmetrical, such that said wall thickness at said starting point is equal to said wall thickness at said ending point.

9. The proportional actuator of claim 7 wherein at least one of said decrease in wall thickness and said increase in wall thickness is linear.

10. The proportional actuator of claim 6, further comprising a third wall segment located between, and continuous with, said first wall segment and said second wall segment.

11. The proportional actuator of claim 10 wherein, moving from said starting point towards said ending point, said first wall segment is characterized by a decrease in wall thickness over its length and said second wall segment is characterized by an increase in wall thickness over its length.

12. The proportional actuator of claim 11 wherein said third wall segment is characterized by a constant wall thickness along its length.

13. The proportional actuator of claim 11 wherein at least one of said decrease in wall thickness and said increase in wall thickness is linear.

* * * * *